Figure 1:
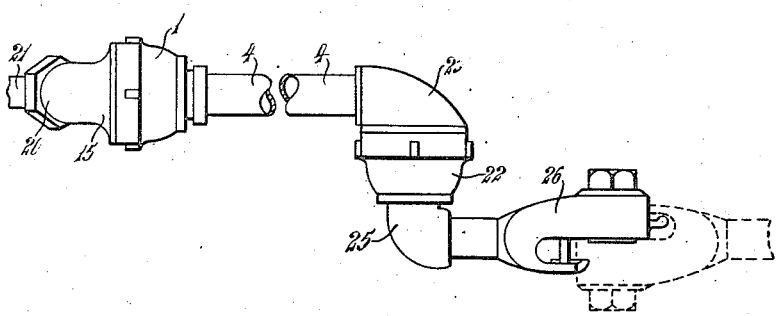

R. E. ROBERTSON.
PIPE COUPLING.
APPLICATION FILED AUG. 13, 1914.

1,154,937.

Patented Sept. 28, 1915.

Witnesses:-
Charles B Crompton
Fred J. Pohl

R. E. Robertson.
Inventor.
By Croydon Marks
Attorney.

UNITED STATES PATENT OFFICE.

RICHARD EDWARD ROBERTSON, OF KELBURN, NEW ZEALAND.

PIPE-COUPLING.

1,154,937.  Specification of Letters Patent.  Patented Sept. 28, 1915.

Application filed August 13, 1914. Serial No. 856,597.

*To all whom it may concern:*

Be it known that I, RICHARD EDWARD ROBERTSON, a citizen of the Dominion of New Zealand, and residing at 41 Grove road, Kelburn, in the Provincial District of Wellington, in the Dominion of New Zealand, engineer, have invented certain new and useful Improvements in Pipe-Couplings, of which the following is a specification.

This invention relates to couplings employed for connecting the air brake apparatus of a railway vehicle to the brake apparatus of another vehicle.

Heretofore, brake couplings made of flexible materials have been employed between railway vehicles, and such couplings rapidly wear out and entail considerable expense in renewals.

The object if this invention is to provide a coupling which will not rapidly wear out.

The invention consists in making a brake coupling of metal piping with a flexible joint at each end, one of the joints being connected to the usual brake or train pipe of a railway vehicle and the other being disposed at a right angle to the pipe and having a right angled elbow into which an ordinary coupling head is screwed.

The drawing herewith illustrates the invention:—

Figures 2, 5:
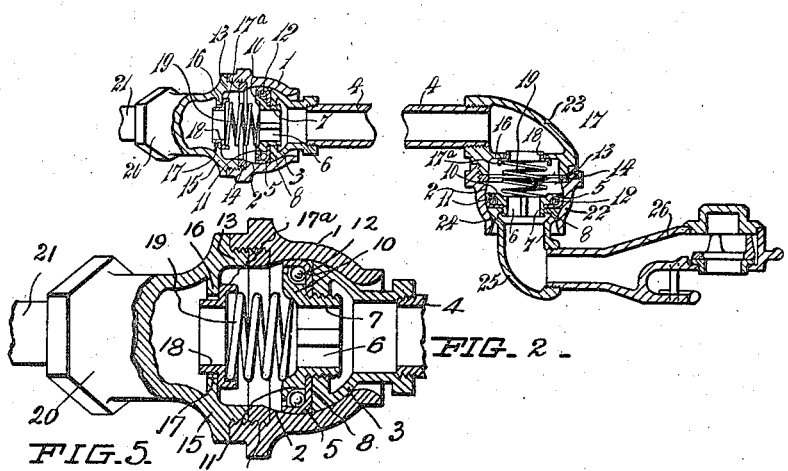
Figure 3:
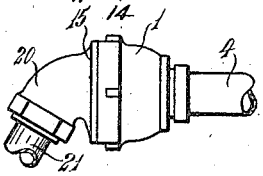

Figure 1, is a plan, and, Fig. 2, a sectional plan of the coupling. Fig. 3, is a side view of one end of the coupling, and Fig. 4, a sectional elevation of a modified form of cap. Fig. 5 is a view similar to the left hand part of Fig. 2 on an enlarged scale.

A socket 1 has a hemispherical or approximately hemispherical interior 2. A hollow ball 3, is made to fit the hemispherical interior of the socket and to screw upon the end of a metal pipe 4. A cup leather 5 makes an air tight joint between the ball 3 and the socket 1 and is retained by a follower 6 having a tubular neck 7 screwed into the ball 3 and having a shoulder 8 which clamps the cup leather against the top of the ball.

The follower has a head 10 provided with a circumferential groove 11 in which an expansion ring 12 is located to press the cup leather outward and hold it in contact with the hemispherical interior 2 of the socket.

The rim 13 of the socket is screw threaded internally and a ring 14 is screwed therein, the interior of the ring forming a continuation of the hemispherical interior 2 of the socket.

The socket has a screw cap 15 provided with an internal flange 16 having a central hole. A ring 17 having a short socket 18 fitting into the hole in the flange 16 forms a cap for a spring 19 which is in compression between the follower 6 and the ring 17 of the socket, when the parts are assembled. The ring 17 has a flange 17ª surrounding the end of the spring 19 the said spring insuring that the ball 3 shall keep its correct position in the socket during the movements of the pipe 4, and the ball 3 and that the said ball shall be prevented from moving inward from its face.

Figure 4:
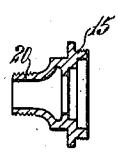

The cap 15 has an integrally screwed socket 20 adapted for screwing to the end of the train or brake pipe, 21. In some cases the end of the train pipe is straight and horizontal, in which case the socket 20 is angled, as shown in Fig. 3. In some cases however, the end of the train pipe is angled in which case the socket 20 has no angle but is made straight, as shown in Fig. 4. The socket 22 at the other end of the pipe 4 is similar to the socket 1 but its cap 23 is angled and the pipe 4 enters at a right angle and its ball 24 has an elbow 25 into which an ordinary Westinghouse coupling 26 screws at a right angle. The balls and sockets provided at each end of the pipe 4 afford the necessary flexibility to permit the coupling to yield freely to every movement of the vehicles, and at the same time to remain air tight.

Connection is made between the brakes of two vehicles by raising the couplings 26 until they go together in the ordinary way, and by pressing them downward, as in the case of coupling the usual flexible couplings together.

The air passes freely through the coupling which is a straight through connection.

The coupling is applicable for use for making flexible connections in water and other pipes.

What I do claim and desire to secure by Letters Patent of the United States is:—

1. In a coupling for the purpose described herein, a casing having a hemispherical interior; a hollow ball fitting the said hemispherical interior, a cup leather making an air tight joint between the ball and the casing, a flange in the interior of the casing defining an opening, a flanged ring fitting the opening, and a spring in compression between the ring and the cup.

2. In a coupling for the purpose described herein, a socket having a hemispherical interior, a hollow ball fitting the said hemispherical interior, a cup leather making an air tight joint between the ball and the socket, an expansion ring in the cup leather, a follower having a circumferential groove for retaining the said ring, a cap screwed into the socket, a flange in the interior of the cap defining an opening, a flanged ring fitting the opening, and a spring in compression between the flanged ring and the follower.

3. In a coupling for the purpose herein described, a socket having a hemispherical interior, a hollow ball fitting the said hemispherical interior, a cup leather making an air tight joint between the ball and the socket, an expansion ring in the cup leather, a follower screwed into the ball and having a circumferential groove for retaining the said ring, a ring screwed into the interior of the socket and forming a continuation of the hemispherical interior of the socket, a cap screwed into the cap defining an opening, a flange in the interior of the socket, a flanged ring fitting the opening, and a spring in compression between the flanged ring and the follower.

In testimony whereof I have signed my name to this specification in the presence of two witnesses.

RICHARD EDWARD ROBERTSON.

Witnesses:
J. J. WATSON,
EDNA J. COLLEY.